United States Patent [19]
Cain et al.

[11] Patent Number: 5,439,700
[45] Date of Patent: Aug. 8, 1995

[54] NON-HYDROGENATED COATING FAT

[75] Inventors: Frederick W. Cain, Voorburg; Adrian D. Hughes, The Hague; Hendrikus Slager, Bussum, all of Netherlands

[73] Assignee: Van den Bergh Foods Co., Division of Conopco, Inc., Lisle, Ill.

[21] Appl. No.: 942,562

[22] Filed: Sep. 9, 1992

[30] Foreign Application Priority Data

Sep. 10, 1991 [EP] European Pat. Off. ............ 91202299

[51] Int. Cl.$^6$ .............................................. A23D 9/00
[52] U.S. Cl. ...................................... 426/607; 426/99
[58] Field of Search ................................. 426/607, 99

[56] References Cited

U.S. PATENT DOCUMENTS

| | | |
|---|---|---|
| 3,174,868 | 3/1965 | Teasdale et al. |
| 4,521,440 | 6/1985 | Lansbergen |
| 4,533,561 | 8/1985 | Ward |
| 4,795,569 | 1/1989 | Higuchi et al. |

FOREIGN PATENT DOCUMENTS 2201878 9/1988 United Kingdom.

OTHER PUBLICATIONS

Swern 1979 Bailey's Industrial Oil and Fat Products pp. 311–322 Wiley & Sons New York vol. 1.
Patton & Jensen 1976 Biomedical Aspects of Lactation Pergamon Press New York pp. 82–83.
European Search Report dated Nov. 24, 1992.
European Search Report dated Apr. 28, 1992.
Rossell, J. B. "Fractionation of Lauric Oils", Journal of American Oil Chemist Society, vol. 62 No. 2 (Feb. 1985) pp. 385–390.
Pease, J. John. "Confectionary Fats from Palm Oil and Lauric Oil", Journal of American Oil Chemist Society, vol. 62 No. 2 (Feb. 1985) pp. 426–430.

*Primary Examiner*—Carolyn Paden
*Attorney, Agent, or Firm*—Rimmma Mitelman

[57] ABSTRACT

The invention concerns blends of lauric fats, with certain specification for $N_{30}$, oleic content, lauric content and elaidic content and fractions of natural fats with an $S_3$ content of at least 50 wt. %. These blends are very useful fats for the preparation of coating fats for confectionery products.

7 Claims, No Drawings

NON-HYDROGENATED COATING FAT

BACKGROUND OF THE INVENTION

In the art of chocolate production, one of the main problems to be overcome was that of the contraction and demoulding of chocolate products produced in a mould. A requirement for a good product and a good production method is that the product does not suffer loss of shape after it has been removed from the mould (=contraction) while the demoulding procedure should not lead to damage of the demoulded product.

In the past, this problem was tackled by using a coating layer for the confectionery product containing hydrogenated fat fractions, such as a hydrogenated palm kernel fraction.

From J. Am. Oil Chem. Soc. 62 (1985), p. 385–389 it is known to use re-fractionated palm kernel stearin fractions in chocolate coatings. The $N_{30}$-values of those fractions are rather high (about 60, according to Table II), its advantage is given a "better finger point resistance". It is expressed, however, that hydrogenated palm kernel stearin has several advantages over the others.

Although the use of hydrogenated products alleviated the demoulding and contraction problems to some extent, it also meant that hydrogenation had to be carried out. Hydrogenation always involves the production of some trans products owing to isomerization occurring during hydrogenation, as illustrated by the formation of elaidic acid. Trans products, however, are less appreciated as they behave like saturated products and are therefore less healthy than unsaturated products. Moreover, the contraction and demoulding problems still remained to some extent.

SUMMARY OF THE INVENTION

We have now found that fat compositions, that can be obtained by fractionation steps only, can be used to prepare a fat composition suitable for application in chocolate coating while the contraction and demoulding of products containing these compositions are at least as good, compared to the products containing the hydrogenated lauric fats.

Therefore, our invention is concerned in the first place with lauric fat compositions displaying:
  a) a solid fat content (NMR, stab.) of: $35 < N_{30} 48$, preferably $40 < N_{30} < 46$;
  b) an oleic acid content of 1–10 wt. %, preferably of 2–8 wt. %;
  c) a content of $C_8$–$C_{14}$ saturated fatty acids of 70–95 wt. %;
  d) an elaidic acid content of less than 1.5 wt. %.

These lauric fat compositions are advantageously obtained as a blend of palm kernel fractions.

DETAILED DESCRIPTION OF THE INVENTION

A preferred fat composition is a blend of 25–55 wt. % of a first palm kernel stearin fraction, such as obtained by fractionation of palm kernel fat and 75–45 wt. % of another palm kernel stearin fraction, such as obtained by double fractionation (or a two-step fractionation) of palm kernel fat.

The above-mentioned lauric fat compositions are excellent fats to be used for the production of non-temper, lauric fat compositions that can be used for the production of hard coatings having good contraction and demoulding characteristics.

In fact, these non-temper, lauric fat compositions comprise the lauric fat compositions mentioned above that additionally contain an amount of and preferably 1–15 wt. % of a natural fat fraction, which fraction contains at least 50 wt. % of tri-saturated glycerides ($S_3$), wherein $S = C_{16} - C_{24}$.

Preferred non-temper, lauric fat compositions are composed in such a way that on basis of the whole composition:
  a) the $S_3$-content is 1–20 wt. %;
  b) the oleic acid content is 1–15 wt. %;
  c) the content of $C_8$–$C_{14}$ saturated fatty acid is 70–95 wt. %;
  d) the elaidic acid content is 0–1.5 wt. %.

These compositions display a solid fat content (NMR, stab.) of $N_{30} = 35$–48.

In these compositions the natural fat is preferably a palm oil stearin fraction.

Another aspect of our invention is the use of these new non-temper, lauric fat compositions in order to produce a hard coating that has good contraction and demoulding characteristics.

Also confectionery products containing at least an amount of the non-temper, lauric fats and chocolate coatings, wherein at least an amount of these fats is present, are part of the invention.

The invention will now be illustrated by the following, non-limiting Examples:

EXAMPLE I

The following fats were prepared:
A: Palm kernel fat was dry-fractionated and the stearin fraction was collected. This stearin fraction was hydrogenated to 34° C. This fraction is fat A, which has the following N-profile: $N_{20}$: 94.5
$N_{25}$: 87.0
$N_{30}$: 42.5
$N_{35}$: 3.0.
Slip melting point: 34° C.
B. The stearin fraction before hydrogenation mentioned above is fat B. The N-profile of this stearin fraction was:
$N_{20}$: 82.0
$N_{25}$: 66.5
$N_{30}$: 29.5
$N_{35}$: 0.1.
Slip melting point: 32° C.
C. Stearin fraction B was dry-fractionated once more. The stearin fraction of this second dry fractionation is fat C. This fat displayed the following N-profile:
$N_{20}$: 91.0
$N_{25}$: 81.0
$N_{30}$: 50.0
$N_{35}$: 0.0.
Slip melting point: 33° C.

The FAME of these fats A, B and C is mentioned in Table I.

TABLE I

| Fat | $C_8$ | $C_{10}$ | $C_{12}$ | $C_{14}$ | $C_{16}$ | $C_{18:0}$ | $C_{18:1}$ | $C_{18:2}$ | $C_{20}$ |
|---|---|---|---|---|---|---|---|---|---|
| A | 1.6 | 2.7 | 54.7 | 21.1 | 8.7 | 11.0 | 0.5 | — | 0.2 |
| B | 1.6 | 2.7 | 54.7 | 21.1 | 8.7 | 2.0 | 7.5 | 1.1 | 0.1 |
| C | 1.1 | 2.3 | 56.1 | 25.3 | 8.8 | 2.1 | 3.5 | 0.5 | 0.1 |

D. A blend was made of 40% of fat B and 60% of fat C; this is fat D. $N_{30}=42\%$; $C_{18:1}=5.1\%$; $C_8-C_{14}=82.9\%$; elaidic = <0.5%.

E. A blend was made of 38% of fat B; 57% of fat C and 5% of palm oil stearin (with 77% $S_3$; $S=C_{16}-C_{24}$).

Coatings were prepared having the following compositions:

Fat: 34%
CC P 10/12: 15%
Sugar: 48%
SMP: 3%
Lecithin: 0.4%
Flavour: 0.02%

The fats used were fats A, D and E.

We have found that fats A and E showed good contraction and good demoulding characteristics. Fat D, however, showed poor contraction and poor demoulding. Bars, demoulded at 38° C. showed immediate fat bloom.

Conclusion: Our non-hardened composition E is at least as good as hardened composition A and far better than blend D.

EXAMPLE II

Example I was repeated, however, the following fats F and G were used in the chocolate coating composition given in example I.

Fat F: A blend of 50 wt. % of fat B, 50 wt. % of fat C and 5 wt. % of palm oil stearin.

Fat G: A blend of 70 wt. % of fat C, 30 wt. % of fat B and 5 wt. % of palm oil stearin.

It was found that the compositions containing fats B, C and the palm oil stearin (so: fats F and G) showed very good demoulding characteristics. It was further found by evaluation by a trained taste panel that the mouthfeel and flavour release from products made from compositions, containing fat G, were similar to those of products made from the reference fat A.

What is claimed is:

1. A non-hydrogenated non-temper, lauric fat composition, said composition comprising
   (1) a lauric fat, displaying the following characteristics:
      (a) a solid fat content (NMR, stabilized) of: $35<N_{30}<48$;
      (b) an oleic acid content of 1–10 wt. %;
      (c) a content of $C_8-C_{14}$ saturated fatty acids of 70–95 wt. %
      (d) an elaidic acid content of less than 1.5 wt. % and
   (2) a fraction of a natural fat, which fraction contains at least 50 wt. % of trisaturated glycerides ($S_3$), wherein S is $C_{16}-C_{24}$,
   wherein the amount of the lauric fat (1) is 85–99 wt. % and the amount of fraction (2) is 1–15 wt. %.

2. Lauric fat composition according to claim 1, wherein on basis of the whole composition:
   a) the $S_3$-content is 1–20 wt. %;
   b) the oleic acid content is 1–15 wt. %;
   c) the content of $C_8-C_{14}$ saturated fatty acid is 70–95 wt. %;
   d) the elaidic acid content is 0–1.5 wt. %.

3. Lauric fat composition according to claim 1, wherein the composition displays an $N_{30}$ of 35–48.

4. Lauric fat composition according to claim 1, wherein the fraction of natural fat (2) is a palm oil stearin fraction.

5. Confectionery products, wherein at least an amount of the fats according to claim 1 is present.

6. Chocolate coatings, wherein at least an amount of the fats according to claim 1 is present.

7. A method of making a confectionery composition, the method comprising incorporating into the composition a hard coating comprising a non-hydrogenated, non-temper, lauric fat composition, said fat composition comprising
   (1) a lauric fat, displaying the following characteristics:
      (a) a solid fat content (NMR, stabilized) of: $35<N_{30}<48$;
      (b) an oleic acid content of 1–10 wt. %;
      (c) a content of $C_8-C_{14}$ saturated fatty acids of 70–95 wt. %;
      (d) an elaidic acid content of less than 1.5 wt. %; and
   (2) a fraction of a natural fat, which fraction contains at least 50 wt. % of trisaturated glycerides ($S_3$), wherein S is $C_{16}-C_{24}$,
   wherein the amount of the lauric fat (1) is 85–99 wt. % and the amount of fraction (2) is 1–15 wt. %.

* * * * *